(12) United States Patent
Gerez et al.

(10) Patent No.: US 9,744,897 B1
(45) Date of Patent: Aug. 29, 2017

(54) TRUCK BED EXTENDER INTEGRATED TO END GATE

(71) Applicant: GM GLOBAL TECHNOLOGY OPERATIONS LLC, Detroit, MI (US)

(72) Inventors: Adalberto Gerez, Sao Paulo (BR);
Fernando C. Picheli, Sao Paulo (BR);
Richard J. Lange, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/141,345

(22) Filed: Apr. 28, 2016

(51) Int. Cl.
*B60P 3/40* (2006.01)
*B60P 1/00* (2006.01)
*B62D 33/027* (2006.01)

(52) U.S. Cl.
CPC .............. *B60P 3/40* (2013.01); *B60P 1/003* (2013.01); *B62D 33/0273* (2013.01)

(58) Field of Classification Search
CPC ........ B60P 3/40; B60P 1/003; B62D 33/0273; B62D 33/03
USPC ..................... 296/57.1, 26.1, 26.11
See application file for complete search history.

(56) References Cited

U.S. PATENT DOCUMENTS

| | | | | |
|---|---|---|---|---|
| 5,478,130 A | * | 12/1995 | Matulin | B62D 33/0273 296/51 |
| 5,533,771 A | * | 7/1996 | Taylor | B62D 33/0273 108/44 |
| 5,924,753 A | * | 7/1999 | DiBassie | B60P 3/40 296/26.09 |
| 6,270,139 B1 | * | 8/2001 | Simpson | B60P 1/435 296/26.01 |
| 6,550,841 B1 | * | 4/2003 | Burdon | B60P 3/40 296/26.11 |
| 9,365,247 B1 | * | 6/2016 | Thompson | B62D 33/08 |
| 2002/0023938 A1 | * | 2/2002 | Kmita | B60P 3/40 224/403 |
| 2004/0227368 A1 | * | 11/2004 | Seksaria | B62D 33/0273 296/26.1 |
| 2006/0145505 A1 | * | 7/2006 | Masterton | B62D 33/0273 296/57.1 |
| 2006/0186685 A1 | * | 8/2006 | Nagle | B62D 33/0273 296/26.11 |
| 2007/0252402 A1 | * | 11/2007 | Marshall | B62D 33/0273 296/57.1 |

FOREIGN PATENT DOCUMENTS

DE          10121614 A1 *  11/2002

* cited by examiner

*Primary Examiner* — Jason S Morrow
(74) *Attorney, Agent, or Firm* — Cantor Colburn LLP

(57) ABSTRACT

An end gate for a vehicle includes a body having a first surface, a second, opposing surface, a first lateral side, a second opposing lateral side, and a first end. The first end is pivotally mounted to the vehicle and a second end extends between the first and second lateral sides spaced from the first end. A plurality of guide members is secured to the first surface of the body. Each of the plurality of guide members includes a guide passage. A selectively deployable bed extender is integrated into the body. The bed extender includes a plurality of post members slidingly received in the guide passage of corresponding ones of the plurality of guide members. At least two of the plurality of post members is pivotally attached to the body. At least one cross member is connected to each of the plurality of post members.

21 Claims, 8 Drawing Sheets

FIG. 11
FIG. 12
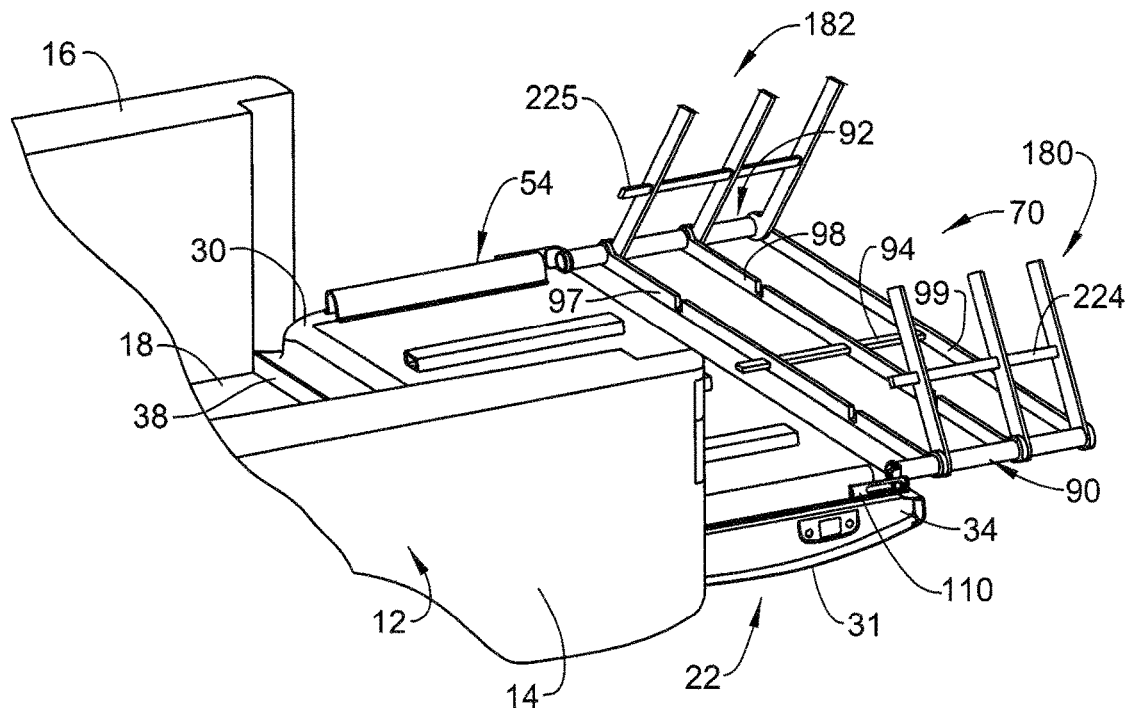
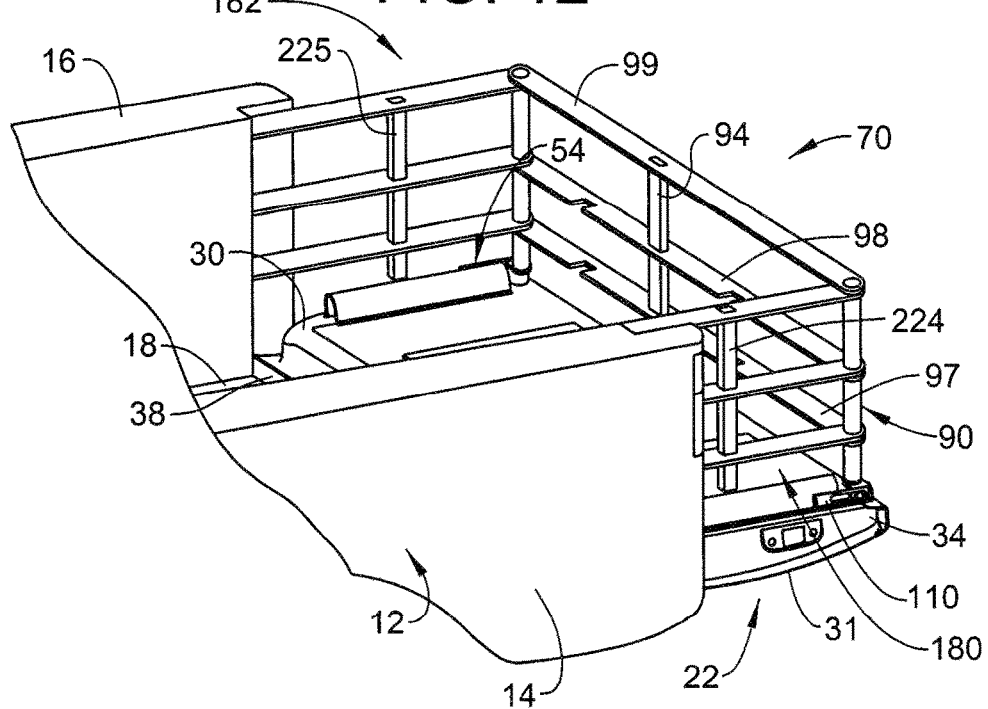

TRUCK BED EXTENDER INTEGRATED TO END GATE

FIELD OF THE INVENTION

The subject invention relates to the art of vehicles and, more particularly, to a truck bed extender integrated into an end gate of a vehicle bed.

BACKGROUND

Various vehicle types include a cargo bed having an end gate. The cargo bed may be employed to receive and retain various types of cargo for transportation. Often times, cargo may be longer than the bed and extend onto the end gate. In such cases, the cargo may require extra attention to prevent slippage. In some cases, after market nets are available to place across an open tail of a cargo bed. The after-market nets must be stowed in the vehicle, may be easily forgotten, and, if not properly secured, may fly off of the vehicle during travel. Accordingly, it is desirable to provide a truck bed extender that is integrated into the vehicle and which is secured to the end gate to reduce unintentional detachment and loss.

SUMMARY OF THE INVENTION

In accordance with an exemplary embodiment, an end gate for a vehicle includes a body having a first surface, a second, opposing surface, a first lateral side, a second opposing lateral side, and a first end extending between the first and second lateral sides. The first end is pivotally mounted to the vehicle, and a second end extends between the first and second lateral sides spaced from the first end by the first and second surfaces. A plurality of guide members is secured to the first surface of the body. Each of the plurality of guide members includes a guide passage. A selectively deployable bed extender is integrated into the body. The bed extender includes a plurality of post members slidingly received in the guide passage of corresponding ones of the plurality of guide members. At least two of the plurality of post members is pivotally attached to the body. At least one cross member is connected to each of the plurality of post members.

In another aspect of an exemplary embodiment, a vehicle includes a cargo bed having a bed surface, a first side wall and a second side wall spaced from the first side wall by the bed surface. An end gate is pivotally mounted relative to the bed surface. The end gate includes a body having a first surface, a second, opposing surface, a first lateral side, a second opposing lateral side, and a first end extending between the first and second lateral sides. The first end is pivotally mounted to the vehicle, and a second end extends between the first and second lateral sides spaced from the first end by the first and second surfaces. A plurality of guide members is secured to the first surface of the body. Each of the plurality of guide members includes a guide passage. A selectively deployable bed extender is integrated into the body. The bed extender includes a plurality of post members slidingly received in the guide passage of corresponding ones of the plurality of guide members. At least two of the plurality of post members is pivotally attached to the body. At least one cross member is connected to each of the plurality of post members.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 11 depicts a second side portion of the selectively deployable bed extender of FIG. 9 being deployed, in accordance with an aspect of an exemplary embodiment; and FIG. 12 depicts the selectively deployable bed extender of FIG. 11 being positioned to connect with first and second side walls of the cargo bed of FIG. 1, in accordance with an aspect of an exemplary embodiment

DESCRIPTION OF THE EMBODIMENTS

Figure 1:
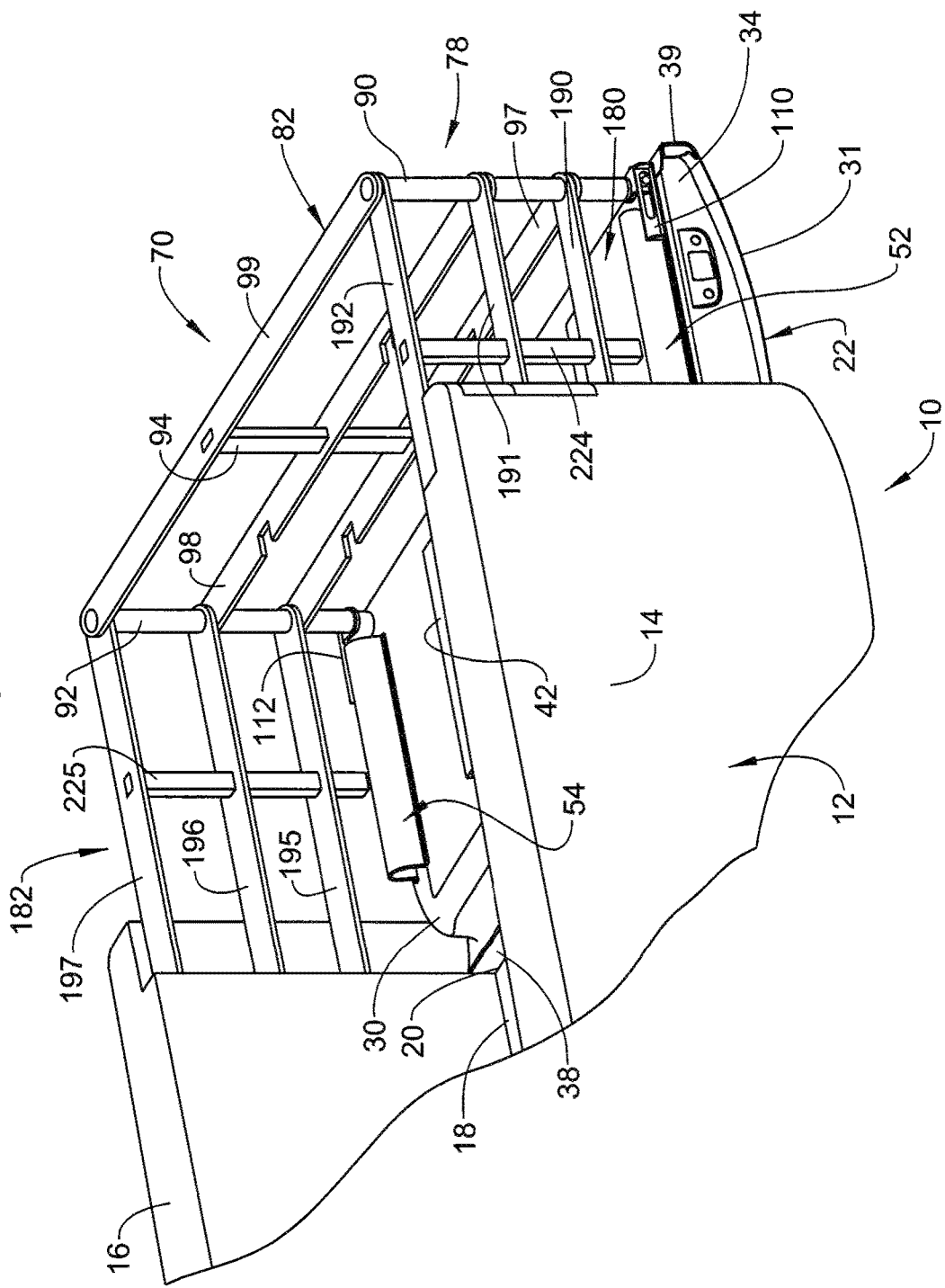
FIG. 1 is a partial view of a vehicle having a cargo bed including an end gate provided with a selectively deployable bed extender, in accordance with an exemplary embodiment.

The following description is merely exemplary in nature and is not intended to limit the present disclosure, its application or uses. It should be understood that throughout the drawings, corresponding reference numerals indicate like or corresponding parts and features.

Figure 2:
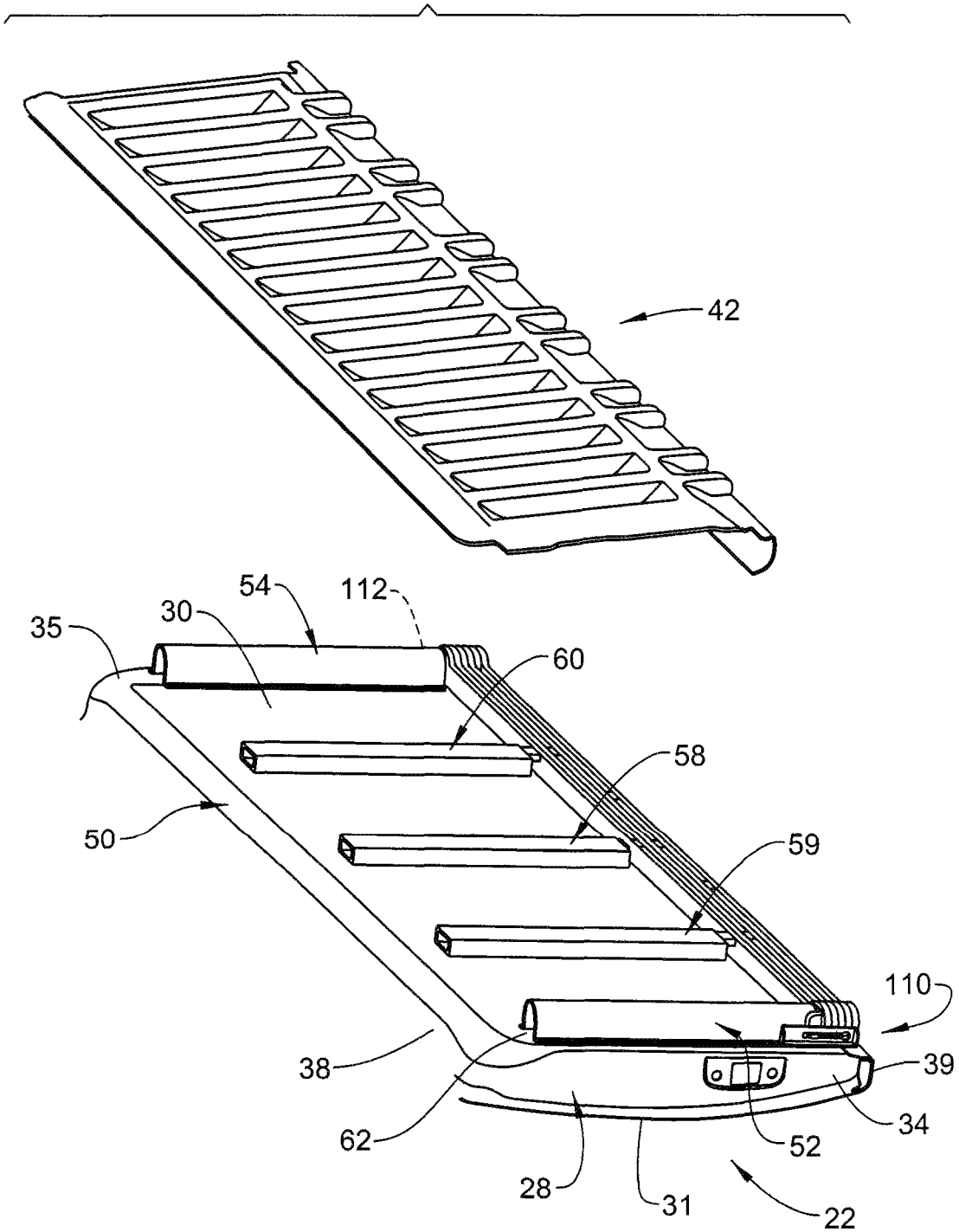
FIG. 2 is a partially disassembled view of the end gate of FIG. 1, in accordance with an aspect of an exemplary embodiment.

A vehicle, in accordance with an exemplary embodiment, is indicated generally at 10 in FIG. 1. Vehicle 10 includes a cargo bed 12 having a first side wall 14, a second side wall 16 and a bed surface 18 extending therebetween. Bed surface 18 includes an outer edge 20 that supports an end gate 22 that is selectively positionable between first and second side walls 14 and 16. As shown in FIG. 2, end gate 22 includes a body 28 having a first surface 30 and a second or exterior surface 31. Body 28 also includes a first lateral side 34, a second lateral side 35, a first end 38 and a second end 39. First end 38 extends between first and second lateral sides 34 and 35 and is pivotally connectable to cargo bed 12. Second end 39 extends between first and second lateral sides 34 and 35 and is spaced from first end 38 by first and second surfaces 30 and 31. A trim member 42 may be mounted to first surface 30 to provide a more finished appearance for end gate 22.

In accordance with an aspect of an exemplary embodiment, end gate 22 includes a plurality of guide members 50 that extend across first surface 30 between first and second ends 38 and 39. Plurality of guide members 50 include a first outer guide member 52, a second outer guide member 54, a first intermediate guide member 58, a second intermediate guide member 59 and a third intermediate guide member 60. Each of the plurality of guide members 50 includes a corresponding guide passage such as shown at 62 in connection with first outer guide member 52. As will be detailed more fully below, the plurality of guide members 50 support, at least in part, a selectively deployable bed extender 70, FIG. 1.

In accordance with an aspect of an exemplary embodiment, bed extender 70 includes a plurality of post members 78 slideably arranged within corresponding ones of the plurality of guide members 50. Bed extender 70 also includes a plurality of selectively shiftable cross members 82 that are selectively positionable along post members 78 as will be detailed more fully below. Plurality of post members 78 include a first outer post member 90, a second outer post member 92 and an intermediate post member 94. It should be understood that the number and location of intermediate post members may vary. Selectively shiftable cross members 82 include a first cross member 97, a second cross member 98 and a third cross member 99. The number and position of selectively shiftable cross members 82 may vary as would be understood by one of ordinary skill in the art.

Figure 3:
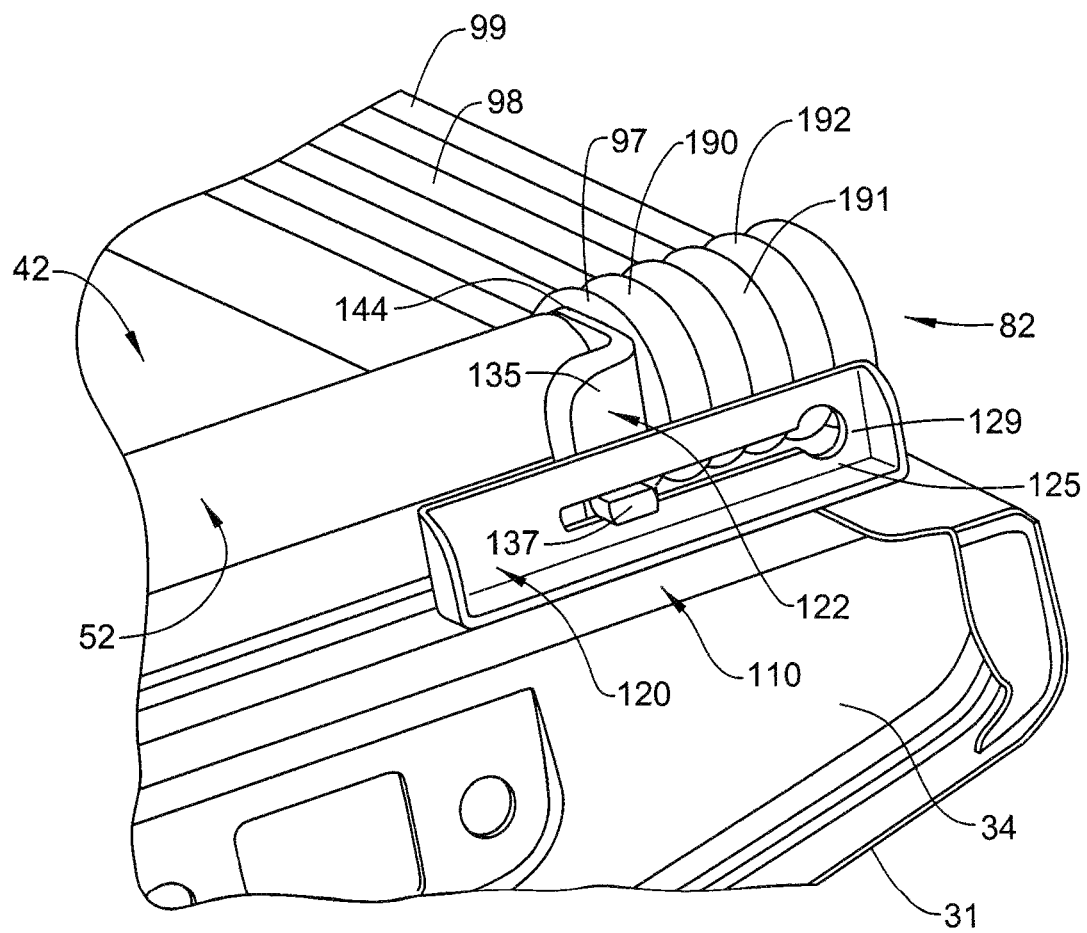
FIG. 3 depicts a rotating bracket mounted to the end gate of FIG. 2, in accordance with an aspect of an exemplary embodiment.
Figure 4:
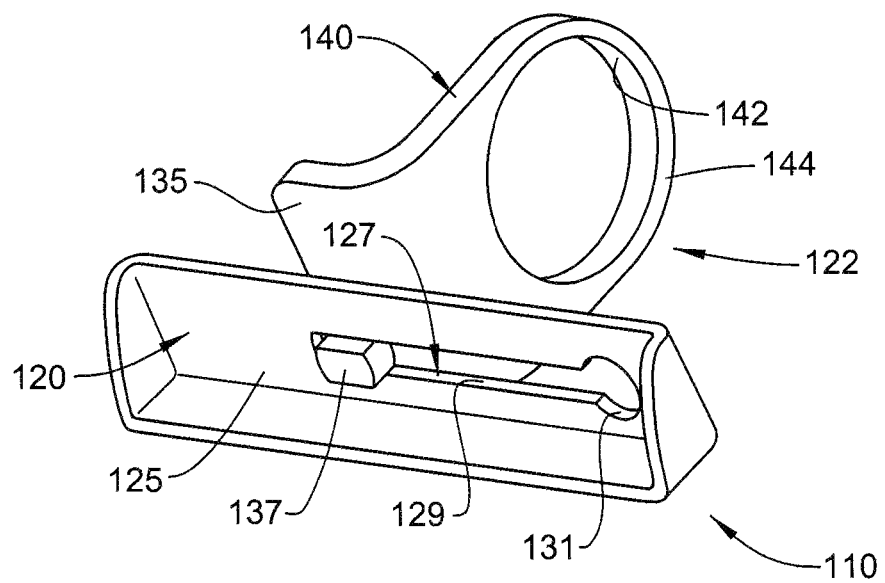
FIG. 4 depicts a perspective view of the rotating bracket of FIG. 3, in accordance with an aspect of an exemplary embodiment.

First and second outer post members 90 and 92 are pivotally mounted to end gate 22 through corresponding first and second rotating brackets 110 and 112. First rotating bracket 110 is mounted to first surface 30 of end gate 22 at first lateral side 34 adjacent second end 39. Second rotating bracket 112 is mounted to first surface 30 of end gate 22 at second lateral side 35 adjacent second end 39. As each rotating bracket 110, 112 is substantially similar, reference will follow to FIGS. 3 and 4 in describing rotating bracket 110 with an understanding that rotating bracket 112 includes similar structure.

Rotating bracket 110 includes a bracket portion 120 and a rotating post support 122. Bracket portion 120 includes a base 125 including a guide track 127 shown in the form of a slot 129. In the exemplary embodiment shown, slot 129 includes a generally rectangular profile extending from a first end (not separately labeled) to a second end (also not separately labeled) arranged at second end 39 of end gate 22. The second end of slot 129 includes an increased dimensional portion 131 having a generally circular profile. Rotating post support 122 includes a base member 135 supporting a guide pin 137 that is received in slot 129. A post receiver 140 extends from base member 135. Post receiver includes an opening 142 defined by a ring 144. Opening 142 includes a generally circular cross-section. With this arrangement, first outer post member 90 may pass through opening 142 and engages ring 144 as will be detailed below.

Figure 5:
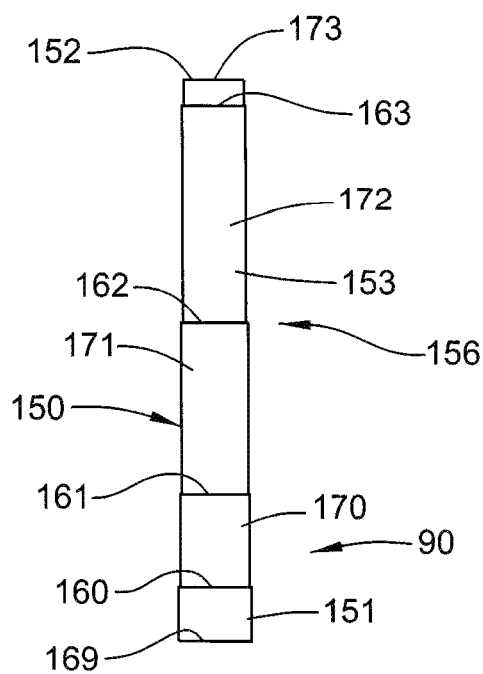
FIG. 5 depicts a plan view of an outer post member of the selectively deployable bed extender, in accordance with an aspect of an exemplary embodiment.

Reference will now follow to FIG. 5 in describing first outer post member 90 with an understanding that second outer post member 92 includes similar structure. First outer post member 90 includes a body 150 having a generally circular cross-section (not separately labeled) extending from a first end 151 to a second end 152 through a tapered or stepped profile 153 including a plurality of landing ridges 156. Plurality of landing ridges 156 includes a first landing ridge 160 arranged proximate to first end 151, a second landing ridge 161, a third landing ridge 162 and a fourth landing ridge 163 arranged proximate to second end 152. With this arrangement, body 150 includes a first portion 169 having a first diameter, a second portion 170 having a second diameter that is less than the first diameter, a third portion 171 having a third diameter that is less than the second diameter, a fourth portion 172 having a fourth diameter that is less than the third diameter, and a fifth portion 173 having a fifth diameter that is less than the fourth diameter. First portion 169 through fifth portion 173 defines tapered or stepped profile 153.

Figure 6:
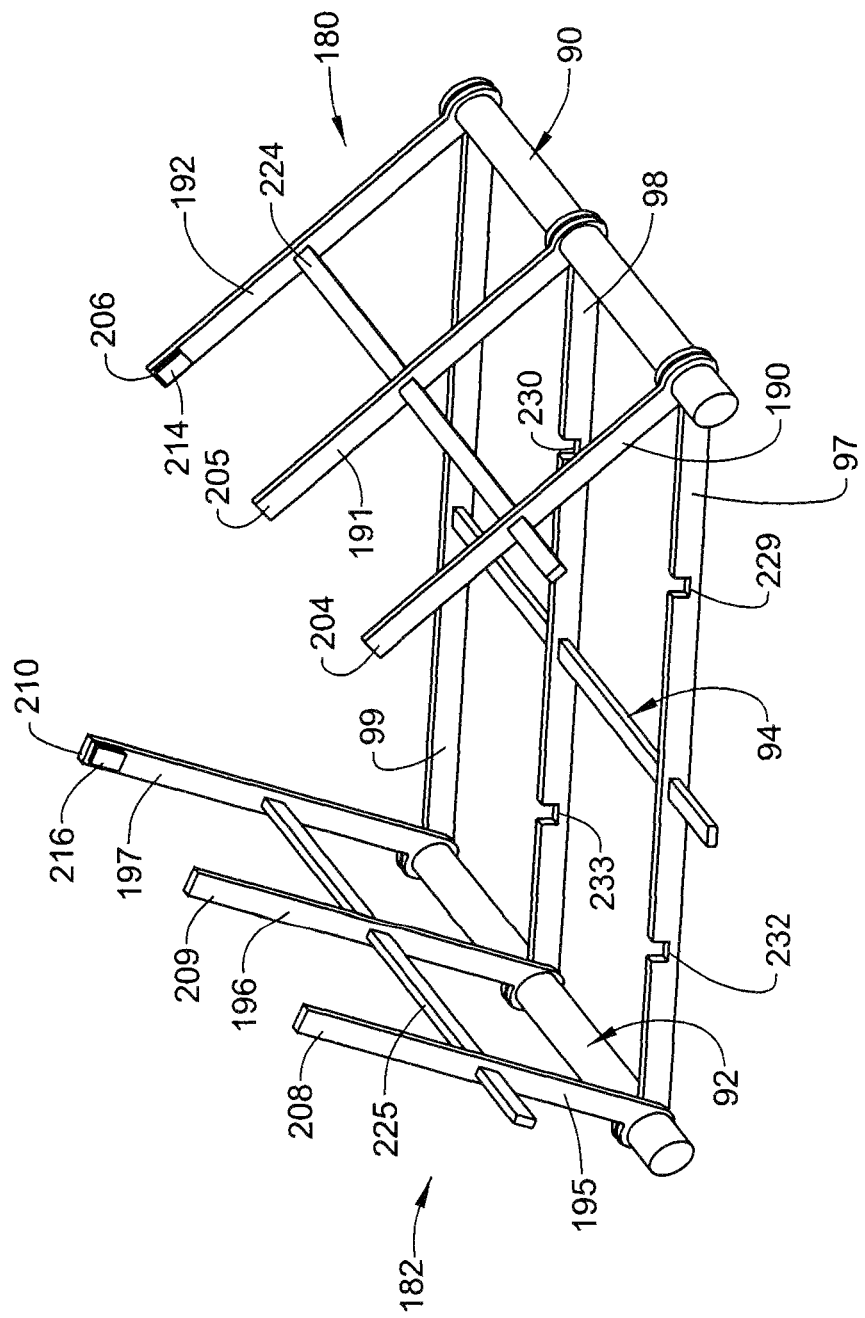
FIG. 6 depicts a perspective view of first and second side portions unfolding from the selectively deployable bed extender, in accordance with an aspect of an exemplary embodiment.

Reference will now follow to FIG. 6 in describing additional details of selectively deployable bed extender 70 in accordance with an aspect of an exemplary embodiment. Selectively deployable bed extender 70 also includes a first foldable side assembly 180 pivotally mounted to first outer post member 90 and an opposing second foldable side assembly 182 pivotally mounted to second outer post member 92. More specifically, first foldable side assembly 180 includes a first side cross member 190, a second side cross member 191 and a third side cross member 192. Second foldable side assembly 182 includes a fourth side cross member 195, a fifth side cross member 196 and a sixth side cross member 197. Of course, it should be understood that the number of side cross members coupled to each outer post member 90, 92 may vary.

First side cross member 190 includes a first cantilevered end portion 204, second side cross member 191 includes a second cantilevered end portion 205 and third side cross member 192 includes a third cantilevered end portion 206. Similarly, fourth side cross member 195 includes a fourth cantilevered end portion 208, fifth side cross member 196 includes a fifth cantilevered end portion 209 and sixth side cross member 197 includes a sixth cantilevered end portion 210.

In accordance with an aspect of an exemplary embodiment, third cantilevered end portion 206 includes a first latch member 214 and sixth cantilevered end portion 210 includes a second latch member 216. First and second latch members 214 and 216 connect with corresponding ones of first and second side walls 14 and 16 of cargo bed 12 to retain selectively deployable bed extender 70 in a deployed configuration such as shown in FIG. 1. First and second latch members 214 and 216 may take on a variety of forms including, but not limited to, hooks, pins, detents, spring latches and the like.

In further accordance with an aspect of an exemplary embodiment, first foldable side assembly 180 includes a least one first side post member 224 associated with first, second and third side cross members 190-192. Second foldable side assembly 182 includes at least one second side post member 225 associated with fourth, fifth and sixth side cross members 195-197. In a manner similar to that described above, first, second and third side cross members 190-192 may slide along and be supported by first side post member 224 and fourth, fifth and sixth side cross members 195-197 may slide along and be supported by second side post member 225. When stowed, first side post member 224 may nest within first and second recesses 229 and 230 formed in corresponding ones of first and second cross members 97 and 98 positioned between first outer post member 90 and intermediate post member 94. Similarly, second side post member 225 may nest within first and second recesses 232 and 233 formed in corresponding ones of first and second cross members 97 and 98 between second outer post member 92 and intermediate post member 94.

Figure 7:
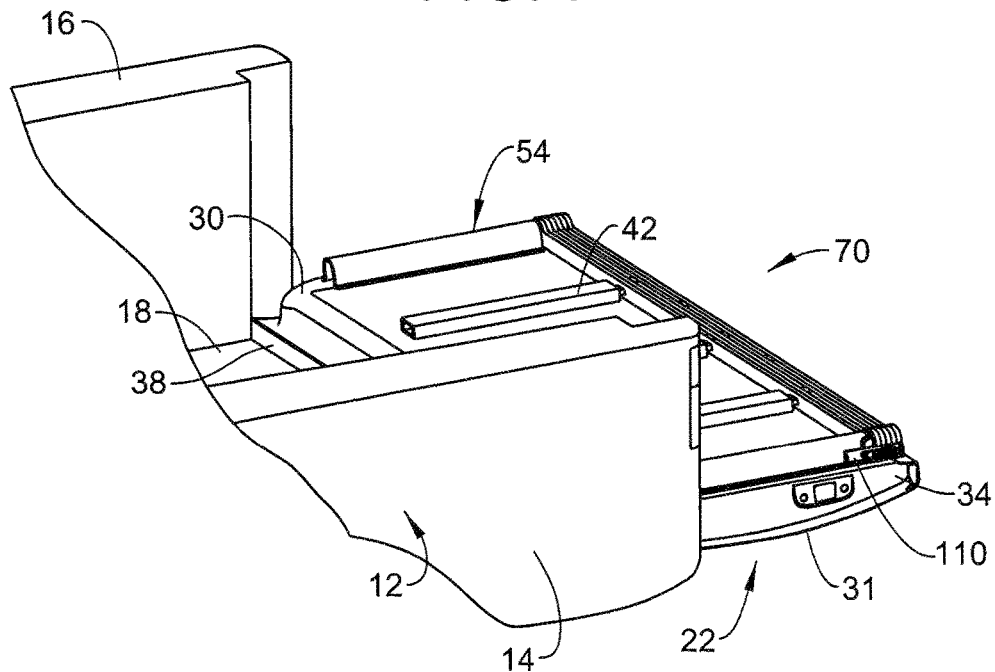
FIG. 7 depicts the selectively deployable bed extender stowed in the end gate of FIG. 1, in accordance with an aspect of an exemplary embodiment.
Figure 8:
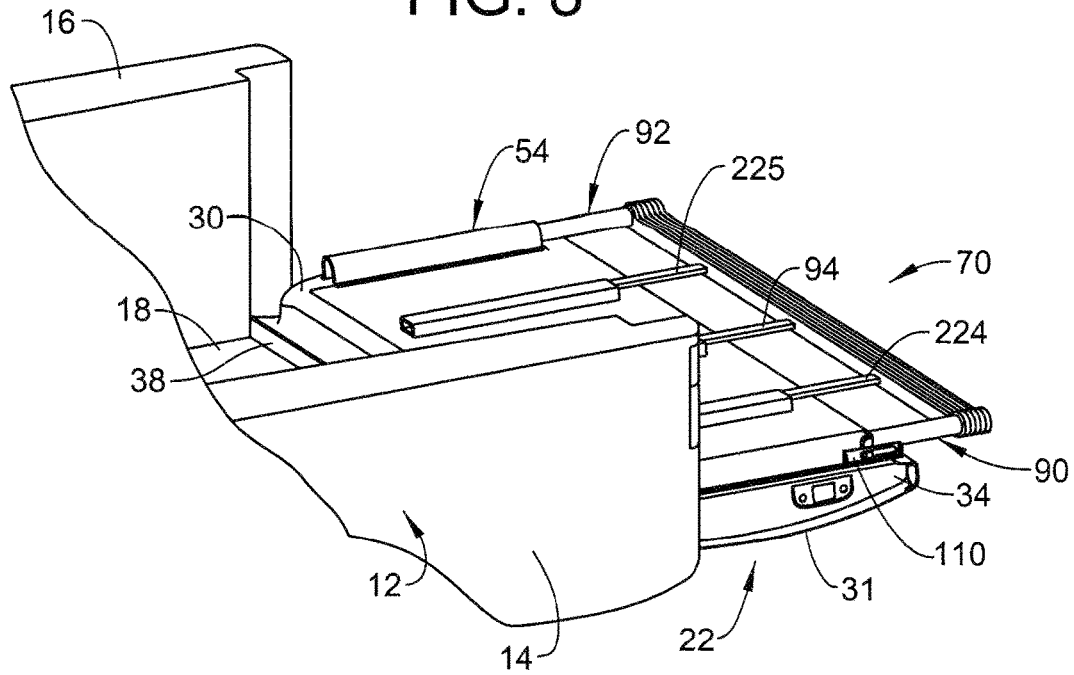
FIG. 8 depicts the selectively deployable bed extender deploying from the end gate of FIG. 1, in accordance with an aspect of an exemplary embodiment.
Figure 9:
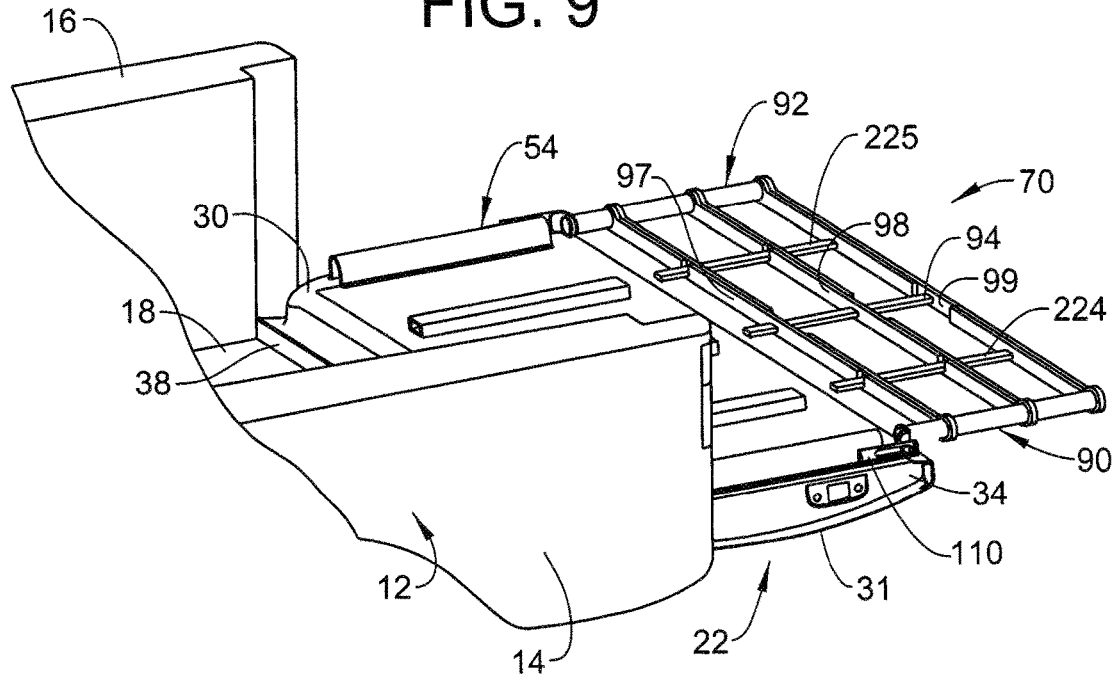
FIG. 9 depicts the selectively deployable bed extender further deployed from the end gate of FIG. 1, in accordance with an aspect of an exemplary embodiment.

Reference will now follow to FIGS. 7-12 in describing a deploying process for selectively deployable bed extender 70. In FIG. 7, with continuing reference to FIGS. 1-6, end gate 22 is shown in an open position. In FIG. 8, selectively deployable bed extender 70 begins to be deployed. First and second outer post members 90 and 92, intermediate post member 94 and first and second side post members 224 and 225 are withdrawn from corresponding ones of the plurality of guide members 50, FIG. 1, to a fully withdrawn configuration as shown in FIG. 9. In this position, first, second, and third cross members 97-99 as well as first through sixth side cross members 190-192 and 195-197 may be shifted along first and second outer post members 90 and 92, intermediate post member 94 and first and second side post members 224 and 225.

Figure 10:
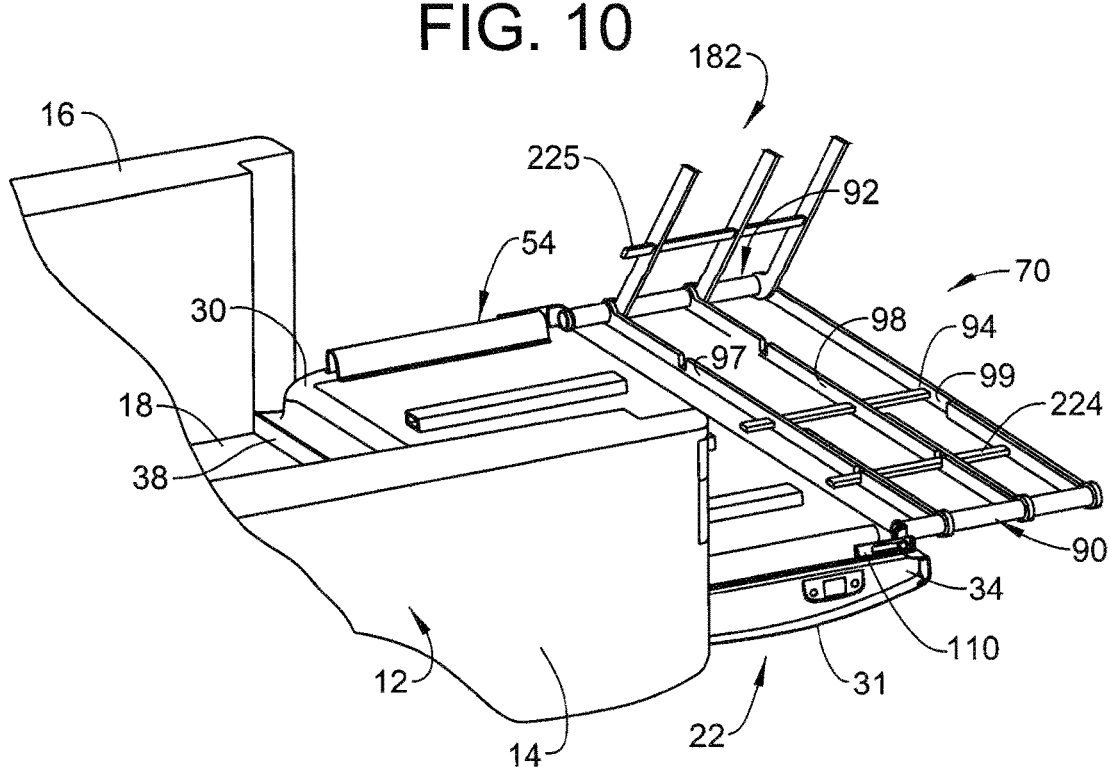
FIG. 10 depicts a first side portion of the selectively deployable bed extender of FIG. 9 being deployed, in accordance with an aspect of an exemplary embodiment.

Cross members 97-99 may be seated upon corresponding ones of the plurality of landing ridges 156 on first outer post member 90 as well as landing ridges (not separately labeled) on second outer post member 92. Side cross members 190-192 and 195-197 may then rest upon corresponding ones of cross members 97-99. When fully withdrawn, first foldable side assembly 182 may be unfolded as shown in FIG. 10 and second foldable side assembly 180 may be unfolded as shown in FIG. 11. In FIG. 12, selectively deployable bed extender 70 is folded upward into a deployed configuration, such as shown in FIG. 1 wherein first and second latch members 214 and 216 are secured to corresponding ones of first and second side walls 14 and 16. Selectively deployable bed extender 70 may be stowed by reversing the above operation.

The exemplary embodiments describe a deployable bed extender that is readily stored and deployed from an end gate of a vehicle. The selectively deployable end gate readily folds and stows and thus need not take up space or be secured in the cargo bed. At this point, it should be understood that the number, arrangement, and material used to form the post members and cross members may vary. It should also be understood that the particular type of vehicle supporting selectively deployable end gate may vary.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An end gate for a vehicle comprising:
a body having a first surface, a second, opposing surface, a first lateral side, a second opposing lateral side, a first end extending between the first and second lateral sides, the first end being pivotally mounted to the vehicle and a second end extending between the first and second lateral sides spaced from the first end by the first and second surfaces;
a plurality of guide members fixedly secured to the body, each of the plurality of guide members including a guide passage; and
a selectively deployable bed extender integrated into the body, the bed extender comprising:
a plurality of post members slidingly received in the guide passage of corresponding ones of the plurality of guide members, the plurality of post members include a first outer post member arranged at the first lateral side, a second outer post member arranged at the second lateral side, and at least one intermediate post member arranged therebetween, at least two of the plurality of post members being pivotally attached to the body; and
at least one slidable cross member connected to each of the plurality of post members.

2. The end gate for a vehicle according to claim 1, wherein the at least one slidable cross member comprises a plurality of cross members.

3. The end gate for a vehicle according to claim 1, wherein the first and second outer post members are pivotally mounted to the body.

4. The end gate for a vehicle according to claim 2, wherein the plurality of guide members includes a first outer guide member arranged at the first lateral side, a second outer guide member arranged at the second lateral side and a plurality of intermediate guide members extending therebetween, a first rotating bracket is arranged at the first outer guide member and a second rotating bracket is arranged at the second outer guide member, the first and second rotating brackets receiving corresponding ones of the first and second outer post members.

5. The end gate for a vehicle according to claim 4, wherein each of the plurality of post members includes a tapered cross-section including a plurality of landing ridges, each of the plurality of landing ridges receiving a respective one of the plurality of cross members.

6. The end gate for a vehicle according to claim 1, further comprising: one or more first side cross members pivotally connected to the first outer post member and one or more second side cross members pivotally connected to the second outer post member.

7. The end gate for a vehicle according to claim 6, wherein at least one of the one or more first side cross members includes a first cantilevered end portion connectable to selectively connected to a first side wall of a cargo bed of the vehicle, and at least one of the one or more second side cross members includes a second cantilevered end portion connectable to a second side wall of the cargo bed of the vehicle.

8. The end gate for a vehicle according to claim 7, further comprising: at least one first side post member connected to the one or more first side cross members and at least one second side post member connected to the one or more second side cross members.

9. The end gate for a vehicle according to claim 8, wherein each of the first and second side post members is selectively stowable in corresponding ones of the plurality of guide members.

10. The end gate for a vehicle according to claim 8, wherein the at least one cross member includes a first recess selectively receiving the first side post member and a second recess selectively receiving the second side post member.

11. The end gate for a vehicle according to claim 8, wherein each of the at least one intermediate post members, and first and second side post members includes a substantially rectangular cross-section and each of the first and second side outer post members includes a substantially circular cross-section.

12. A vehicle comprising:
a cargo bed including a bed surface, a first side wall and a second side wall spaced from the first side wall by the bed surface;

an end gate pivotally mounted relative to the bed surface, the end gate including a body having a first surface, a second, opposing surface, a first lateral side, a second opposing lateral side, a first end extending between the first and second lateral sides, the first end being pivotally mounted to the vehicle and a second end extending between the first and second lateral sides spaced from the first end by the first and second surfaces;

a plurality of guide members fixedly secured to the body, each of the plurality of guide members including a guide passage; and a selectively deployable bed extender integrated into the body, the bed extender comprising:

a plurality of post members slidingly received in the guide passage of corresponding ones of the plurality of guide members, the plurality of post members include a first outer post member arranged at the first lateral side, a second outer post member arranged at the second lateral side, and at least one intermediate post member arranged therebetween, at least two of the plurality of post members being pivotally attached to the body; and at least one slidable cross member connected to each of the plurality of post members.

13. The vehicle according to claim 12, wherein the at least one cross member comprises a plurality of cross members.

14. The vehicle according to claim 12, wherein the first and second outer post members are pivotally mounted to the body.

15. The vehicle according to claim 13, wherein the plurality of guide members includes a first outer guide member arranged at the first lateral side, a second outer guide member arranged at the second lateral side and a plurality of intermediate guide members extending therebetween, a first rotating bracket is arranged at the first outer guide member and a second rotating bracket is arranged at the second outer guide member, the first and second rotating brackets receiving corresponding ones of the first and second outer post members.

16. The vehicle according to claim 15, wherein each of the plurality of post members includes a tapered cross-section including a plurality of landing ridges, each of the plurality of landing ridges receiving a respective one of the plurality of cross members.

17. The vehicle according to claim 12, further comprising: one or more first side cross members pivotally connected to the first outer post member and one or more second side cross members pivotally connected to the second outer post member.

18. The vehicle according to claim 17, wherein at least one of the one or more first side cross members includes a first cantilevered end portion connectable to selectively connected to the first side wall, and at least one of the one or more second side cross members includes a second cantilevered end portion connectable to the second side wall.

19. The vehicle according to claim 17, further comprising: at least one first side post member connected to the one or more first side cross members and at least one second side post member connected to the one or more second side cross members.

20. The vehicle according to claim 19, wherein each of the first and second side post members is selectively stowable in corresponding ones of the plurality of guide members.

21. The vehicle according to claim 19, wherein the at least one cross member includes a first recess selectively receiving the first side post member and a second recess selectively receiving the second side post member.

* * * * *